(12) United States Patent
Mickael

(10) Patent No.: US 10,921,486 B2
(45) Date of Patent: Feb. 16, 2021

(54) INTEGRATED LOGGING TOOL

(71) Applicant: Scientific Drilling International, Inc., Houston, TX (US)

(72) Inventor: Medhat W. Mickael, Sugar Land, TX (US)

(73) Assignee: SCIENTIFIC DRILLING INTERNATIONAL, INC., Houston, TX (US)

(*) Notice: Subject to any disclaimer, the term of this patent is extended or adjusted under 35 U.S.C. 154(b) by 301 days.

(21) Appl. No.: 16/112,201

(22) Filed: Aug. 24, 2018

(65) Prior Publication Data

US 2019/0064388 A1   Feb. 28, 2019

Related U.S. Application Data

(60) Provisional application No. 62/549,653, filed on Aug. 24, 2017.

(51) Int. Cl.
| | |
|---|---|
| *G01V 11/00* | (2006.01) |
| *G01V 1/46* | (2006.01) |
| *G01V 5/12* | (2006.01) |
| *G01V 1/52* | (2006.01) |
| *G01V 5/06* | (2006.01) |

(52) U.S. Cl.
CPC ............ *G01V 11/002* (2013.01); *G01V 1/46* (2013.01); *G01V 1/52* (2013.01); *G01V 5/06* (2013.01); *G01V 5/12* (2013.01); *G01V 11/00* (2013.01); *G01V 2200/16* (2013.01)

(58) Field of Classification Search
CPC ........ G01V 11/002; G01V 11/00; G01V 1/46; G01V 1/52; G01V 5/06; G01V 5/12; G01V 2200/16
See application file for complete search history.

(56) References Cited

U.S. PATENT DOCUMENTS

| | | | |
|---|---|---|---|
| 4,686,364 A * | 8/1987 | Herron | E21B 49/00 250/256 |
| 5,235,285 A * | 8/1993 | Clark | E21B 17/1078 324/342 |
| 5,594,706 A | 1/1997 | Shenoy et al. | |
| 5,899,958 A * | 5/1999 | Dowell | E21B 47/12 702/6 |
| 5,987,385 A | 11/1999 | Varsamis et al. | |
| 6,012,018 A * | 1/2000 | Hornbuckle | G01V 1/34 702/16 |
| 7,253,401 B2 | 8/2007 | Mickael | |
| 7,257,490 B2 | 8/2007 | Georgi et al. | |
| 9,557,435 B2 | 1/2017 | Sugiyama et al. | |
| 10,132,955 B2 * | 11/2018 | Donderici | E21B 47/10 |

(Continued)

FOREIGN PATENT DOCUMENTS

| | | |
|---|---|---|
| WO | 2017007745 A1 | 1/2017 |
| WO | 2017058239 A1 | 4/2017 |

OTHER PUBLICATIONS

International Search Report and Written Opinion issued in international application No. PCT/US2018/047972 dated Nov. 1, 2018 (10 pages).

*Primary Examiner* — Raymond L Nimox
(74) *Attorney, Agent, or Firm* — Adolph Locklar

(57) ABSTRACT

An integrated logging tool includes an outer housing and an insert, the insert positioned within the outer housing. The integrated logging tool further includes a gamma sensor within the insert.

26 Claims, 13 Drawing Sheets

(56) References Cited

U.S. PATENT DOCUMENTS

| | | | | |
|---|---|---|---|---|
| 2004/0158404 A1* | 8/2004 | Gaston | G01V 1/44 | 702/6 |
| 2005/0199794 A1* | 9/2005 | Mickael | G01V 5/06 | 250/261 |
| 2006/0106541 A1* | 5/2006 | Hassan | G01V 1/48 | 702/6 |
| 2006/0276969 A1* | 12/2006 | Georgi | G01V 11/00 | 702/11 |
| 2009/0222209 A1* | 9/2009 | Morys | G01V 11/005 | 702/9 |
| 2012/0192640 A1* | 8/2012 | Minh | G01V 11/005 | 73/152.16 |
| 2013/0238306 A1* | 9/2013 | Lagenwalter | G06F 30/20 | 703/10 |
| 2014/0177391 A1* | 6/2014 | Sugiyama | E21B 47/01 | 367/81 |
| 2017/0242152 A1* | 8/2017 | Chen | G01V 3/32 | |
| 2018/0100950 A1* | 4/2018 | Yao | E21B 47/09 | |
| 2018/0196157 A1* | 7/2018 | Zeroug | G01V 1/46 | |

* cited by examiner

INTEGRATED LOGGING TOOL

CROSS-REFERENCE TO RELATED APPLICATIONS

This application is a nonprovisional application that claims priority from U.S. provisional application No. 62/549,653, filed Aug. 24, 2017, which is hereby incorporated by reference in its entirety.

FIELD

The present disclosure is directed to an integrated downhole instrument for evaluating hydrocarbon bearing formations.

BACKGROUND

Recovering hydrocarbons from shale and other low permeability formations (hereinafter "unconventional formations") is different from recovering hydrocarbons from conventional reservoirs. For instance, recovering hydrocarbons from an unconventional formation, unlike recovering hydrocarbons from conventional reservoirs, may necessitate recovering hydrocarbons from the source rock as well as the reservoir rock. Traditionally, while porosity and saturation are of primary interest in conventional reservoirs, organic content, mineralogy, rock brittleness, natural fracturing, thermal maturity, and hydrocarbon type are the parameters used to evaluate unconventional formations. In addition, unconventional formations may be spread over a large area with substantial variation in production potential. Variations in sediment source and oxic-anoxic conditions during deposition can cause significant variations in organic content, mineralogy, and rock mechanical properties within the unconventional formation. Thus, identifying a "sweet spot" or optimal position for well placement is of value. Further, unlike conventional reservoirs where larger inter-connected pores provide fluid permeability values in the millidarcy to darcy range, ultra-fine-grained unconventional formations often have permeability values in the microdarcy to nanodarcy range. Since the well production rate is a function of the permeability of the formation and the well surface area exposed to the formation, economic production rates in unconventional formations are typically achieved by vastly increasing the well surface area through horizontal drilling, and having the wellbore intersect natural and/or induced fractures. Evaluation of such horizontal wells by use of wireline logging tools is operationally problematic and risky, as well as being economically costly.

Conventional well logging may use gamma ray measurements for identification of clean, i.e. non-shale zones, resistivity measurements for water saturation determination, and neutron/density measurements for porosity determination. Unconventional formations may use different measurements for different formation parameters than conventional well logging, including azimuthal and spectral gamma ray measurements, for determination of total organic carbon (TOC) and adjustment of the borehole position during drilling to reach one or more geological targets (referred to hereinafter as "geosteering"), sonic measurements for porosity and mechanical property determination, and imaging devices for fracture detection and identification.

SUMMARY

The present disclosure provides for an integrated logging tool. The integrated logging tool includes an outer housing and an insert, the insert positioned within the outer housing. The integrated logging tool further includes a gamma ray sensor.

The present disclosure provides for a method for determining unconventional formation parameters. The method includes deploying an integrated logging tool in a wellbore, the integrated logging tool including an outer housing, an insert, the insert positioned within the outer housing, and a spectral gamma ray sensor positioned within the insert. The method also includes determining total gamma ray.

BRIEF DESCRIPTION OF DRAWINGS

The present disclosure may be understood from the following detailed description when read with the accompanying figures. It is emphasized that, in accordance with the standard practice in the industry, various features may not be drawn to scale. In fact, the dimensions of the various features may be arbitrarily increased or reduced for clarity of discussion.

DETAILED DESCRIPTION

Figure 1:
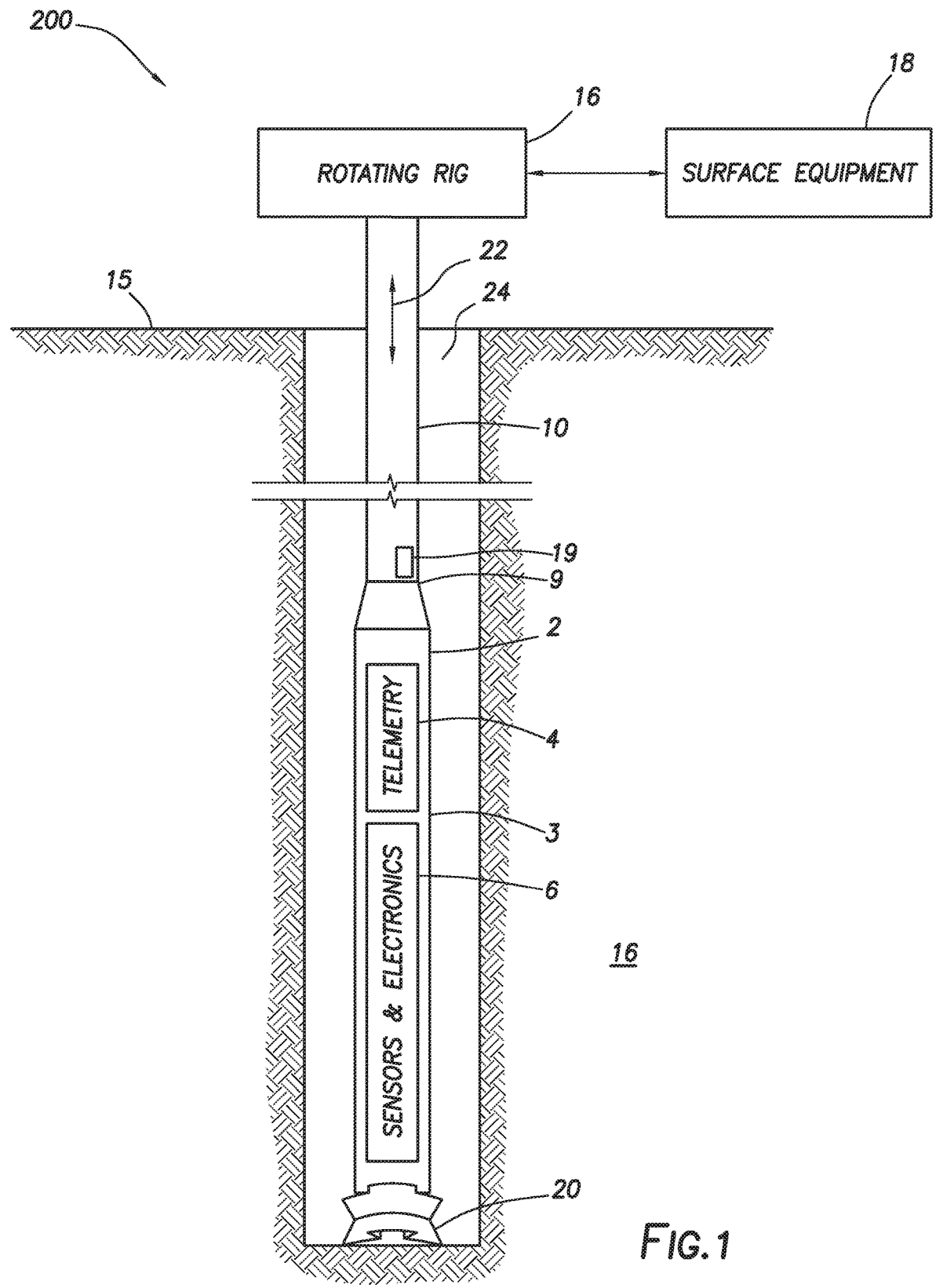
FIG. 1 is a block diagram of a drilling system including an integrated logging tool in a logging while drilling (LWD) configuration consistent with at least one embodiment of the present disclosure.

A detailed description will now be provided. The following disclosure includes specific embodiments, versions and examples, but the disclosure is not limited to these embodiments, versions or examples, which are included to enable a person having ordinary skill in the art to make and use the disclosure when the information in this application is combined with available information and technology. In addition, the present disclosure may repeat reference numerals and/or letters in the various examples. This repetition is for the purpose of simplicity and clarity and does not in itself dictate a relationship between the various embodiments and/or configurations discussed.

Various terms as used herein are shown below. To the extent a term used in a claim is not defined below, it should be given the broadest definition persons in the pertinent art have given that term as reflected in printed publications and issued patents. Further, unless otherwise specified, all compounds described herein may be substituted or unsubstituted and the listing of compounds includes derivatives thereof.

Further, various ranges and/or numerical limitations may be expressly stated below. It should be recognized that unless stated otherwise, it is intended that endpoints are to be interchangeable. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.).

Certain embodiments of the present disclosure are directed towards an integrated logging tool for measuring formation parameters of unconventional reservoirs. In certain embodiments, measurements may include spectral gamma, such as for determining TOC and for geosteering, acoustic measurements for determining mechanical properties, porosity, and seismic correlation, and a high-resolution imaging device for fracture identification.

FIG. 1 is a block diagram of drilling system 200 including integrated logging tool 3 in a logging while drilling (LWD) configuration consistent with at least one embodiment of the present disclosure. Integrated logging tool 3 includes drill collar 2; drill collar 2 may be mechanically coupled to the lower end of drill string 10. Integrated logging tool 3 may include sensors and associated electronics 6 (including, for example, one or more microprocessors). Integrated logging tool 3 may also include telemetry section 4. Telemetry section 4 may include a transmitter or transceiver, such as a mud pulse generator, or an acoustic or electromagnetic transmitter to transmit measurement data from the sensors to the surface 15 as illustrated by telemetry arrow 22. When telemetry section 4 includes a transceiver, data and instructions may be communicated to integrated logging tool 3 from surface equipment 18. Surface equipment 18 may include a receiver, a transceiver, and equipment for storage of measurement data and providing instructions to integrated logging tool 3, much as a micro-processor and computer-readable, non-transitory media. Wired pipe may also be used to communicate from integrated logging tool 3 to surface equipment 18 and vice versa. Drill string 10 terminates in bit 20. Integrated logging tool 3 may be conveyed in borehole 24 that penetrates formation 26 by rotating drill string 10 from surface rig 16 (indicated by rotating rig 16 in FIG. 1). In certain embodiments as shown in FIG. 1, sensors and associated electronics 6 may communicate with MWD system 9. MWD system 9 may include MWD system controller 19.

In some embodiments, telemetry section 4 may include a transmitter or transceiver and a magnetic dipole or electric dipole antenna for short-range communication between integrated logging tool 3 and MWD system 9. In other embodiments short-range communication may be through other physical channels such as acoustic wave propagation through the drilling fluid or drill collar 2 and drill string 10. In some embodiments the short-range communication system may be used to transmit measurement data from integrated logging tool 3 to MWD system 9 and/or from MWD system 9 to integrated logging tool 3. In some embodiments, MWD system 9 may include a telemetry system to transmit measurement data received from integrated logging tool 3 to surface equipment 18. In some embodiments, telemetry section 4 may be used for only short-range communication between the integrated logging tool 3 and MWD system 9 and may not be used for communication to surface equipment 18. In some embodiments, telemetry section 4 may be used for both short-range communications between integrated logging tool 3 and MWD system 9 and may also be used for communication to surface equipment 18 and/or from surface equipment 18 to telemetry section 4.

In some embodiments, integrated logging tool 3 may not include a telemetry section 4. In some embodiments, sensor & electronics 8 may be in electrical communication with MWD system 9, such as through wiring from the integrated logging tool 3 to MWD system 9. MWD system 9 may be used to record data from integrated logging tool 3 to memory and/or in some embodiments, communicate such data in real time to MWD system 9. In some embodiments, MWD system 9 may include one or more microprocessors, memory, and a telemetry system to transmit measurement data received from integrated logging tool 3 to surface equipment 18.

Figure 2:
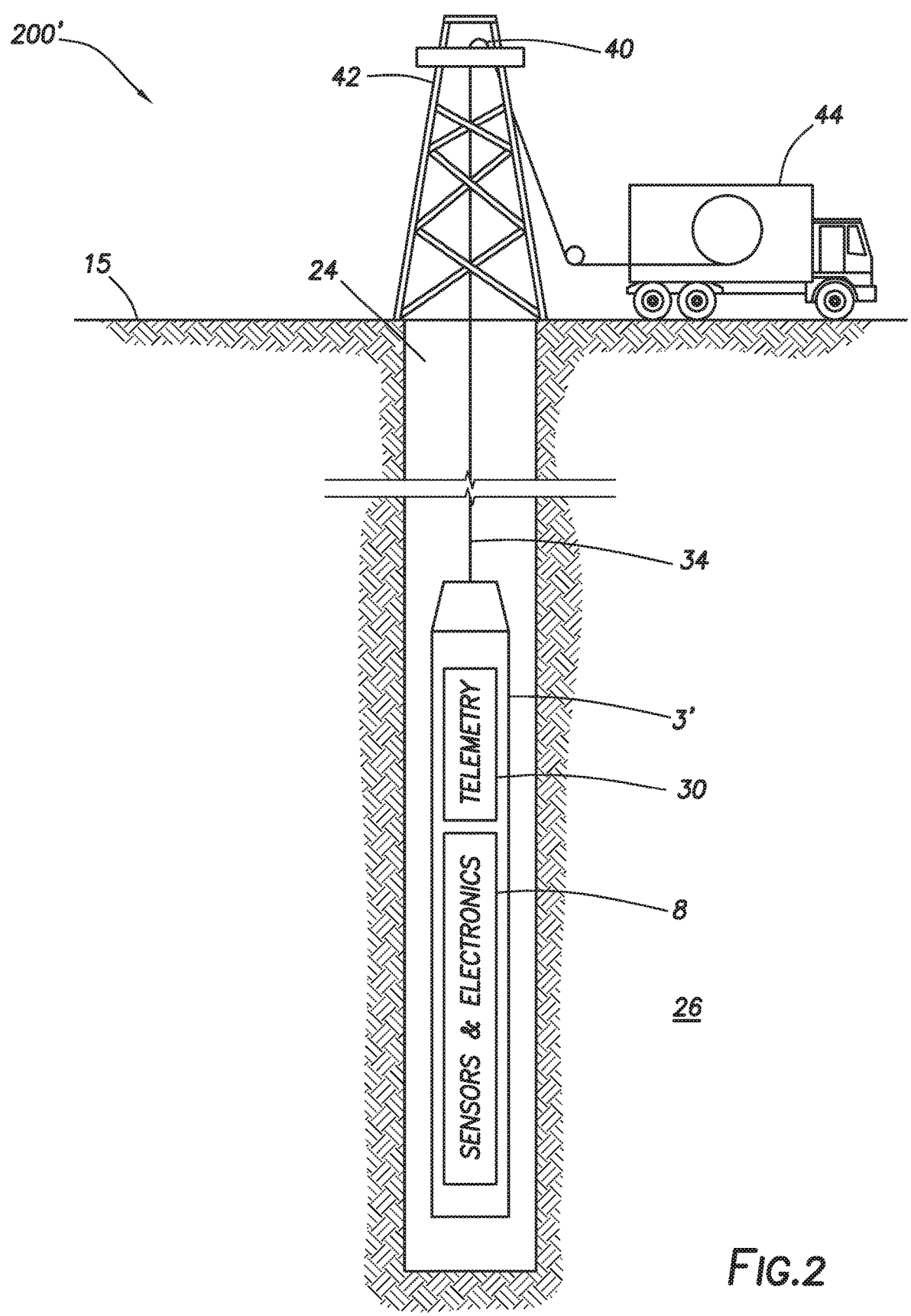
FIG. 2 is a block diagram of a drilling system including an integrated logging tool in a wireline configuration consistent with at least one embodiment of the present disclosure.

FIG. 2 is a block a diagram of another embodiment of the present disclosure. FIG. 2 depicts well logging system 200' including integrated logging tool 3', which is a wireline tool. Integrated logging tool 3' is conveyed in borehole 24 within formation 26 with cable 34. In some embodiments, cable 34 may provide for power and/or communication between wireline surface equipment 44 at surface 15 and integrated logging tool 3'. Integrated logging tool 3' may include sensors and associated electronics 6 for measuring formation parameters of formation 26 and wireline telemetry section 30 that communicates with surface equipment 44 through cable 34. In some embodiments, integrated logging tool 3' may not include telemetry section 4. In some embodiments, integrated logging tool 3' may measure formation parameters of interest using sensors & electronics 8 and record that data to memory inside sensors & electronics 8. In some embodiments the measurements will be acquired and recorded according to a predetermined schedule that is programmed into the sensors & electronics 8. In some embodiments, the measurements will be acquired and recorded according to a schedule that is dynamically adjusted or configured based on measurements from the sensors & electronics 8 and/or combination of those measurements and other measurements communicated over cable 34. Integrated logging tool 3' may be carried over pulley 40 supported by derrick 42. Integrated logging tool 3' deployment and retrieval may be performed by a powered winch carried by wireline surface equipment 44, such as, as shown in FIG. 2, a service truck.

Figure 3:
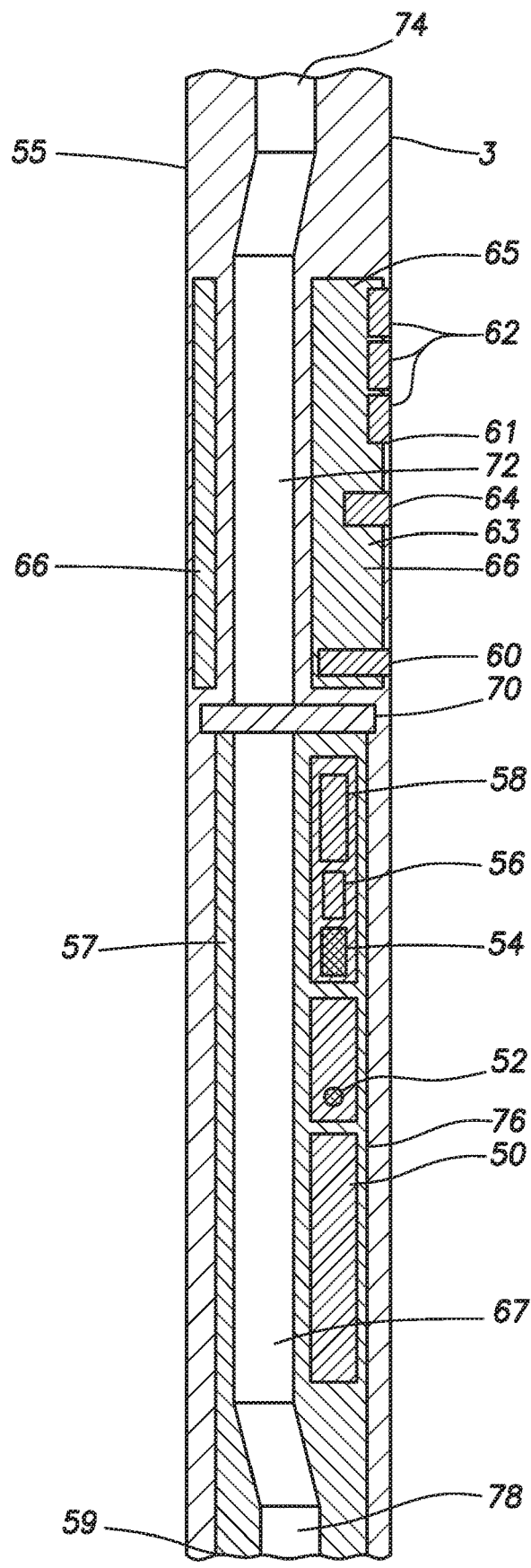
FIG. 3 is a cross-sectional view of an integrated logging tool in a LWD configuration consistent with at least one embodiment of the present disclosure.

FIG. 3 is a cross-sectional view of integrated logging tool 3 in a LWD configuration. Integrated logging tool 3 includes outer housing 55 with off-center bore 72. Off center bore 72 extends from connector housing 70 to connector bore 74. Connector bore 74 is a center bore aligned with the bore of the drill string above integrated logging tool 3. Integrated logging tool 3 includes inner housing 57 extending from connector housing 70 to bottom end 59 of integrated logging tool 3. Insert 76 is positioned within inner housing 57 and sealed against connector housing 70. Insert 76 includes insert offset bore 67 connected to inset center bore 78 positioned to align with the bore of the drill string below integrated logging tool 3.

Insert 76 may include sensors & electronics 58 associated with the sensors and for communication with the MWD system controller 19. In the embodiment shown in FIG. 3, gamma ray sensor 50, inclination sensor 52, vibration sensors 54, directional sensors 56, and electronics 58 are located within insert 76. Gamma ray sensor 50 may be a spectral gamma ray sensor. In a non-limiting embodiment, the spectral gamma ray sensor is gamma ray detector comprising a scintillation crystal and a cooperating light sensing device, such as a photomultiplier tube. In a non-limiting embodiment, inclination sensor 52 may be an inclinometer or one or more accelerometers. In a non-limiting embodiment, vibration sensors 54 may be one or more accelerometers. In a non-limiting embodiment, directional sensors 56 may include one or more magnetometers, gyroscopes, and accelerometers or any combination thereof. In some embodiments, the same sensor or sensors may be used for multiple purposes. For example, the accelerometers used in inclination sensor 52 may also be used as vibration sensors 54, and as directional sensors 56.

The sensors located within insert 76 are designed to evaluate unconventional formations. For instance, gamma ray sensor 50, such as a spectral gamma ray sensor may provide potassium, uranium and thorium concentrations for total organic carbon (TOC) determination in addition to total gamma ray and azimuthal gamma ray measurements for clay typing and geosteering. Inclination sensor 52 may provide borehole inclination for geosteering. Vibration sensors 54 may provide vibration measurements, such as tri-axial vibration measurements while drilling and also provide gravitational toolface or angular position information when integrated logging tool 3 is stationary. Directional sensors 56 may, together with electronics 58 measure signals from other sensors as a function of magnetic and/or gravity toolface while drilling or logging, with these resultant measurements commonly referred to as "azimuthal measurements." If the azimuth measurements are made using magnetometers in directional sensors 56, then the reference of the magnetometers may be calibrated when the tool is stationary using vibration sensors 54, or inclination sensor 52, or accelerometers in directional sensors 56. Alternately, gravity toolface may be continuously calculated and calibrated by the electronics 58 using direction sensors 56 and/or inclination sensor 52, and/or vibration sensors 54.

Electronics 58 may gather data from sensors located within insert 76, record that data to memory, and, in some embodiments, communicate such data in real time to MWD system 9. Electronics 58 may include one or more microprocessors, memory, and a transceiver. Memory may be a non-transitory computer readable medium for storage of data and instructions.

In a non-limiting embodiment, gamma ray sensor 50 and electronics 58 may be located with a single insert 76. In some embodiments, the single insert 76 may also contain an, inclination sensor 52, vibration sensors 54, directional sensors 56. Locating one or all of gamma ray sensor 50, electronics 58, inclination sensor 52, vibration sensors 54, directional sensors 56, and electronics 58 within a single insert 76 reduces the length of the bottom hole assembly as compared to separately locating these sensors, thereby reducing the number of tool joints and tool joint failures, as well as reducing the cost of integrated logging tool 3. In addition, by reducing the length of the bottom hole assembly gamma ray sensor 50, inclination sensor 52, vibration sensors 54, and/or directional sensors 56 are closer to bit 20 than if these sensors & electronics 58 were separately located. Locating these sensors closer to the bit provides better information of the location of bit 20 and the unconventional formation near the bit than if the sensors were located further from the bit. For instance, in the embodiment shown in FIG. 3, integrated logging tool 3 makes it possible to locate gamma ray sensor 50, inclination sensor 52, vibration sensors 54, directional sensors 56 and electronics 58 between 30 and 45 feet closer to bit 20 than were the sensors not located within a single insert 76. In alternate embodiments, more than one insert 76 may be used in place of a single insert 76, but function as to house electronics 58 and gamma ray sensor 50. In some embodiments, the additional inserts 76 may house the inclination sensor 52, vibration sensors 54, or directional sensors 56.

In some embodiments, inclination sensor 52, vibration sensors 54, and directional sensors 56 may be located within MWD system 9. In some embodiments, directional sensors from MWD system 9 may be used to compute magnetic and/or gravity toolface while drilling. In some embodiments, magnetic and/or gravity toolface measurements may be communicated from MWD system 9 to sensors & electronics 8. When integrated with measurements from the sensors & electronics 8, integrated logging system may produce azimuthal measurements. The integration may occur in real-time using the measurements communicated from MWD system 9 to sensors & electronics 8 or by integrating memory recorded magnetic and/or gravity toolface measurements made by MWD system 9 with memory recorded measurements from sensors & electronics 8 from the integrated logging tool 3.

In certain embodiments, as shown in FIG. 3, acoustic transmitter 60, acoustic isolator 66, and one or more acoustic receivers 62 (collectively "acoustic sensor package 63) may be located within cutout 65 positioned circumferentially about off center bore 61 of integrated logging tool 3. In certain embodiments, acoustic sensor package 63 may be electrically connected with electronics 58, such as through wires from acoustic sensor package 63 through connector housing 70 to electronics 58 in the insert 76.

Figure 3A:
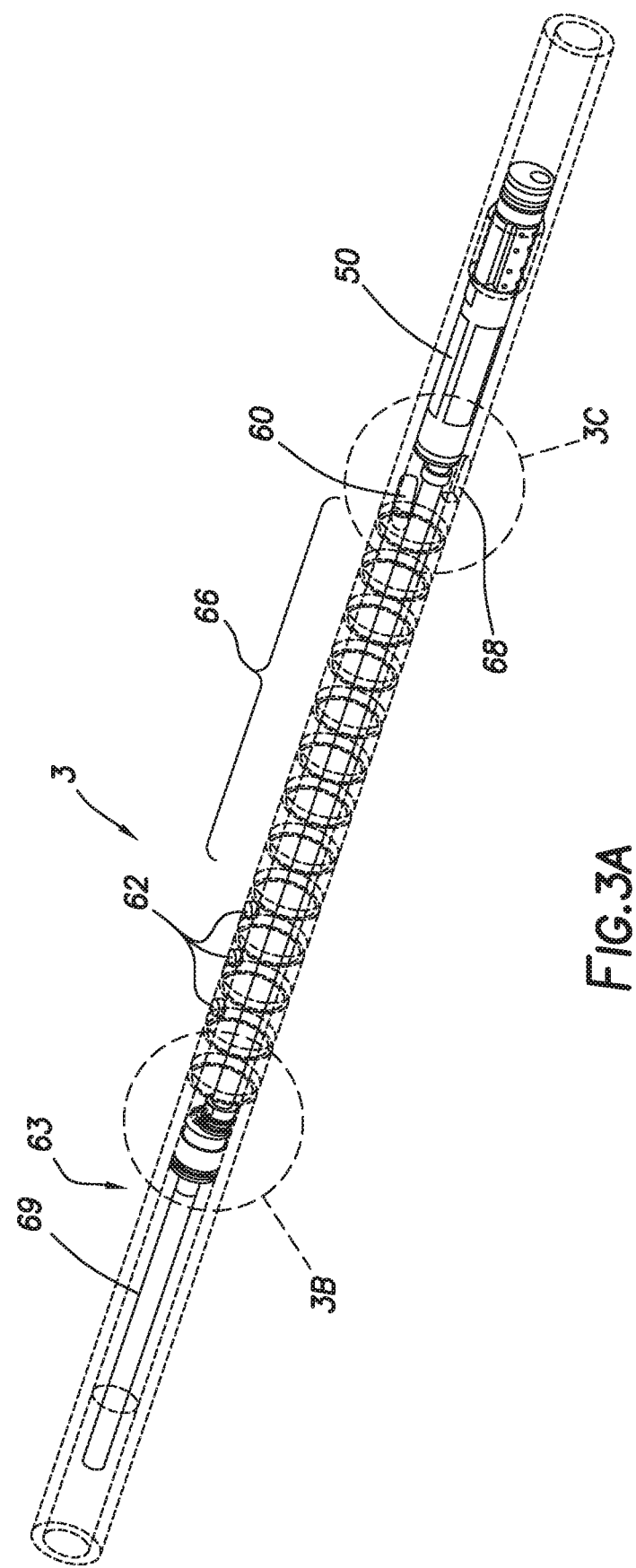
FIG. 3A is a partially transparent perspective view of an integrated logging tool in a LWD configuration consistent with at least one embodiment of the present disclosure.
Figure 3B:
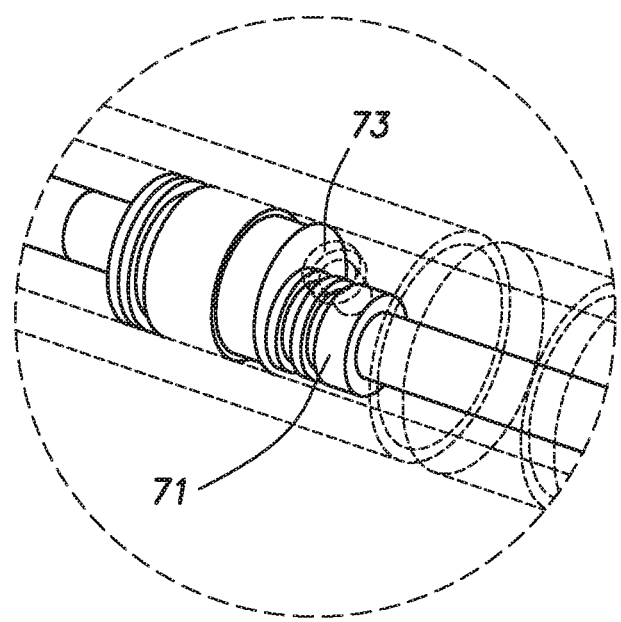
FIG. 3B and 3C are detail views of portions of FIG. 3A.
Figure 3C:
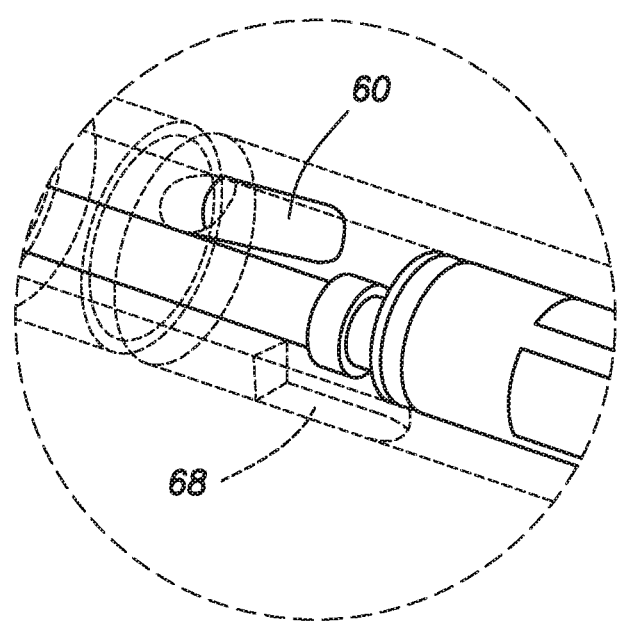

FIGS. 3A-C depict partially transparent perspective views of integrated logging tool 3, including center bore 61, acoustic sensor package 63, acoustic transmitter 60, acoustic isolator 66, acoustic receivers 62, ultrasonic imager 68 (as discussed further herein below), and gamma ray sensor 50. In some embodiments, one or more components of integrated logging tool 3 may be included as part of sonde 69 positioned within outer housing 55. In some embodiments, integrated logging tool 3 may include one or more high speed download ports 71. High speed download port 71 may be used to download data collected by integrated logging tool 3 when integrated logging tool 3 is at the surface. High speed download port 71 of integrated logging tool 3 may be accessible through access port 73 formed in outer housing 55 as depicted in FIG. 3B.

In certain embodiments, electronics 58 may include a clock. In some embodiments, each of the sensors in insert 76 use a single clock included in electronics 58. In some embodiments, acoustic sensor package 63 may use the same clock on electronics 58 as each of the sensors in insert 76. By using the same clock, differences in timing among the sensors in insert 76 and/or the acoustic sensor package 63 may be eliminated, reducing error.

Figure 4:
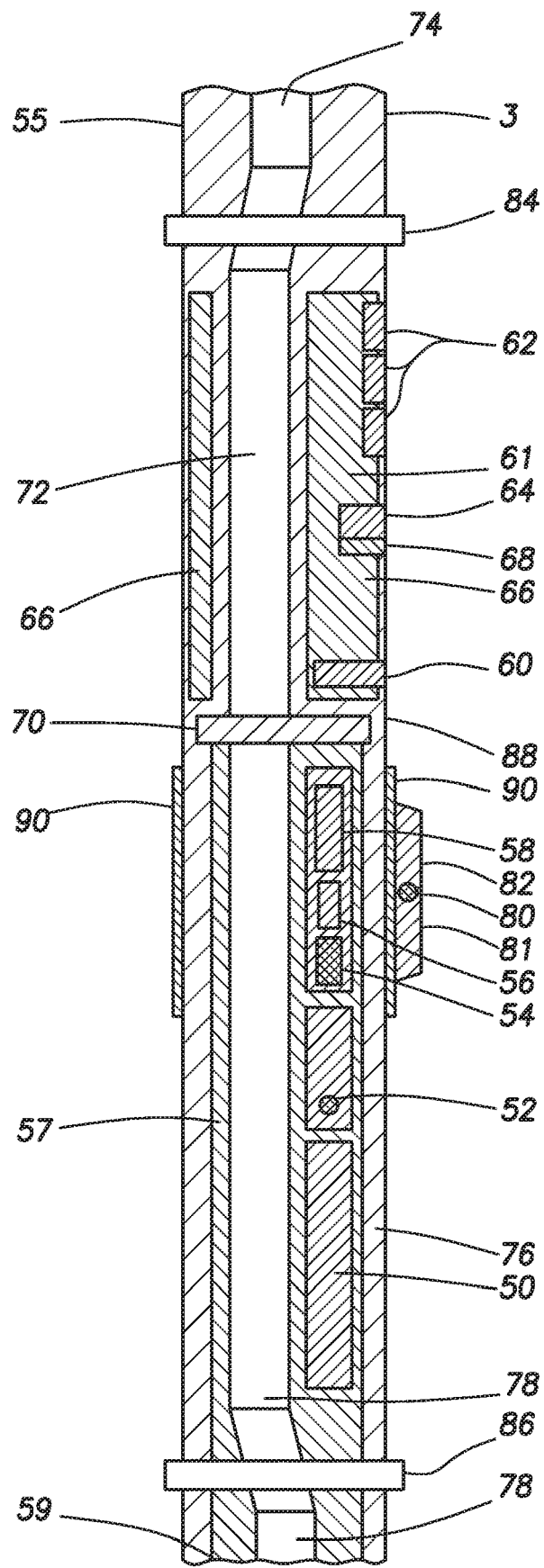
FIG. 4 is a cross sectional view of an integrated logging tool in a LWD configuration consistent with at least one embodiment of the present disclosure.

As shown in FIGS. 3 and 4, the sensors and electronics 58 in insert 76 may be interleaved. By interleaving the sensors and electronics 58 in insert 76, the length of insert 76 and therefore integrated logging tool 3 may be reduced.

The acoustic transmitter 60 and acoustic receivers 62 may be used to provide unconventional formation velocity measurements. Acoustic velocity measurements are used to determine formation porosity and formation mechanical properties. In addition, formation velocity measurements may be used for seismic correlation. Ultrasonic transducer 64 may be used for multiple purposes. Ultrasonic transducer 64 may measure the acoustic travel time through borehole 24 to determine standoff, i.e., the distance between integrated logging tool 3 and unconventional formation. Ultrasonic imager 68 may also use the acoustic signal amplitude may also provide an image, such as a high-resolution image of the acoustic impedance of the formation, used to identify fractures.

FIG. 4 depicts integrated logging tool 3 including electrical imager 81. Electrical imager 81 includes button electrode array 80 installed on a stabilizer 82 that is electrically insulated from outer housing 55 with insulating sleeve 90. In one embodiment, upper transmitter/receiver toroid 84 placed above button electrode array 80 and lower transmitter/receiver toroid 86 placed below button electrode array 80 may be used with or without button electrode array 80.

Figure 10:
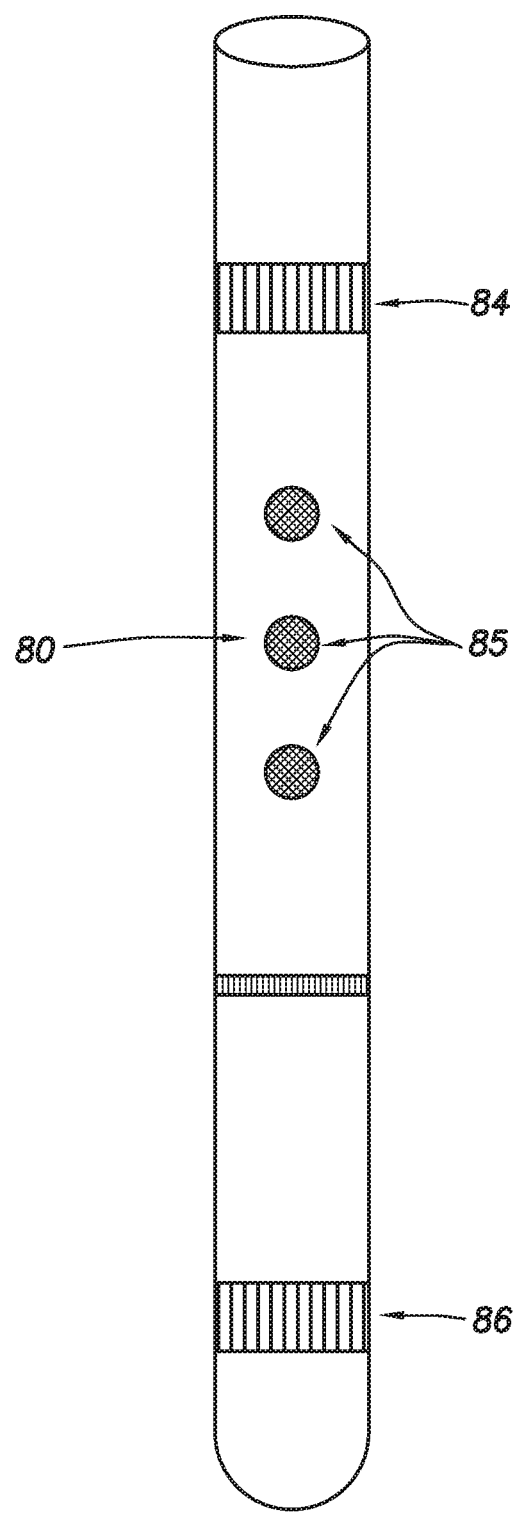
FIG. 10 is a schematic drawing of a button electrode array consistent with certain embodiments of the present disclosure.

In certain embodiments, imaging may be performed by button electrode array 80 without upper transmitter/receiver toroid 84 and lower transmitter/receiver toroid 86. Stabilizer 82 may include one or more button electrodes 85 of button electrode array 80 at constant potential. A schematic drawing of button electrode array 80 is depicted in FIG. 10. A voltage may be applied, resulting in an alternating current to flow from each button electrode 85 in button electrode array 80 into the unconventional formation. The alternating current may be received at a return electrode 88 located on outer housing 55, which is insulated from the stabilizer 82 with insulating sleeve 90. Button electrodes 85 of button electrode array 80 respond to current density, which is related to localized formation resistivity. The measurement of current density has a high-resolution capability in measuring variations from each button electrode 85 of button electrode array 80 to return electrode 88 compared to conventional images from gamma ray or density tools. The resolution of the current density measurement made by button electrodes 85 of button electrode array 80 is, in part, determined by the size of button electrodes 85. Button electrodes 85 may be of less than an inch in diameter. Without being bound by theory, any feature that is as large as the buttons will be resolved. As used herein, a "feature" may include, but not be limited to, a fracture, a borehole breakout, or a drilling-induced gouge. "Resolved" means that the feature can be detected and its dimensions can be determined from an image. If the feature is smaller than the size of the button, the feature may be detected but with larger dimensions than the actual features possesses. In addition, the resistivity of the interval between button electrodes 85 of button electrode array 80 and return electrode 88 results in low-resolution capability compared to conventional gamma ray or density images in the form of a background signal. The low-resolution capability in the form of a background signal does not provide an absolute measurement of formation resistivity, but rather a record of changes in resistivity. The high-resolution measurements provide an azimuthal electrical image of the formation if the return current is a function of gravity toolface or magnetic toolface.

Figure 5:
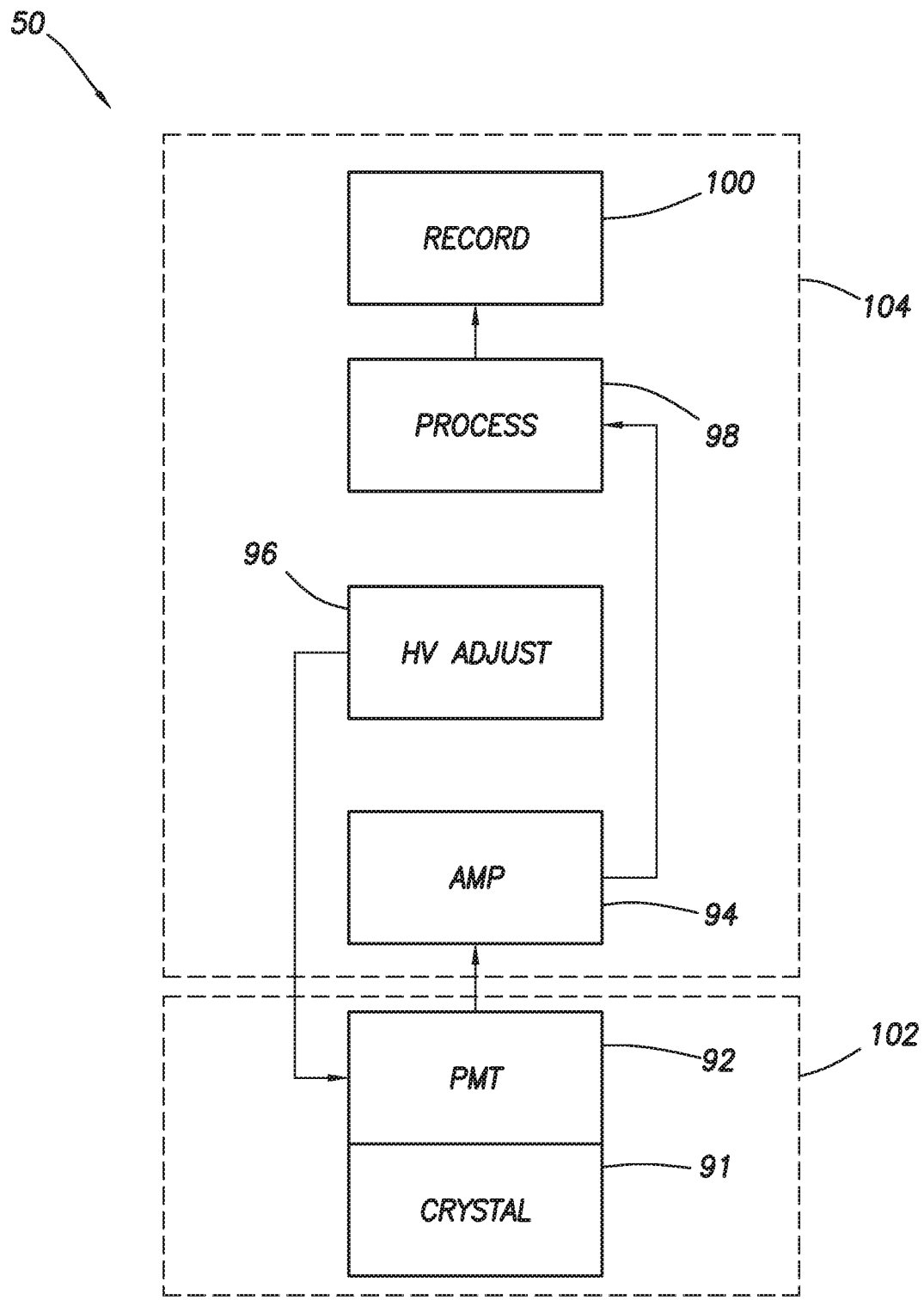
FIG. 5 is a flow diagram of a spectral gamma ray measurement using an integrated logging tool consistent with at least one embodiment of the present disclosure.

FIG. 5 is a block diagram of spectral gamma ray sensor 50 in certain embodiments of the present disclosure. Sensor element 102 includes scintillation crystal 91 and photomultiplier tube (PMT) 92. During operation, signals from photomultiplier tube 92 may be gain adjusted. In certain embodiments, the gain of the signal from photomultiplier tube 92 is a function of downhole temperature and may be adjusted using high voltage adjustment circuit (HVC) 96 to form a gain-adjusted signal. The gain-adjusted signal is sent to gamma sensor electronics 104, where the gain-adjusted signals are amplified using amplifier 94. The amplified signals are processed using processing circuit 98 and recorded using a recording circuit 100. In certain embodiments, the amplified signals are fast rise, slow decay pulses with a width of a few microseconds. The pulses are fed to processing circuit 98 where the peak of the pulse is determined. The height of the pulse (at the peak) is proportional to the energy of the gamma ray. Processing circuit 98 may tally the number of gamma rays with different heights (energies) to construct a spectrum of counts versus energy.

Figure 6:
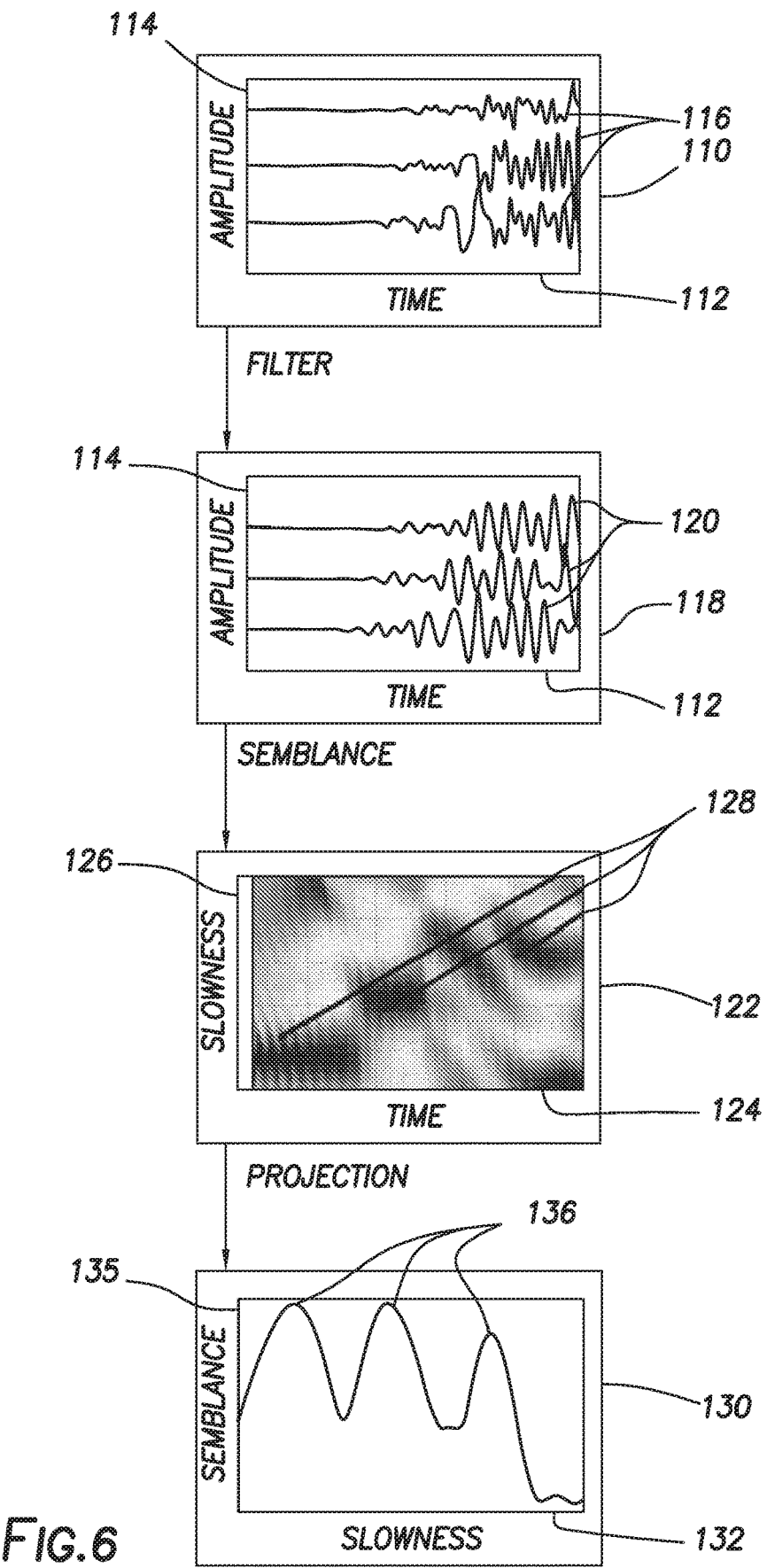
FIG. 6 is a flow diagram of an acoustic measurement using an integrated logging tool consistent with at least one embodiment of the present disclosure.

FIG. 6 shows a flow diagram of an acoustic measurement. Acoustic transmitter 60 fires an acoustic pulse in the frequency range of 5-25 KHz or 5-15 KHz at time T=0 into unconventional formation 26. Acoustic receivers 62 receive the acoustic pulse after the acoustic pulse is refracted from unconventional formation 26. The acoustic signals received by acoustic receiver 62 are shown in signal receipt graph 110 for three acoustic receivers 62, but two or more receivers can be used.

In signal receipt graph 110, X axis 112 represents time after firing of acoustic transmitter 60 and Y axis 114 represents the amplitude of the acoustic signal received by acoustic receivers 62. Waveforms 116 represent acoustic signals received by three acoustic receivers 62. Receipt of acoustic signals is delayed by a delay time (DT) from one among acoustic receivers 62. DT may be used to calculate the formation velocity V for a predetermined acoustic receiver spacing DX as V=DX/DT. Calculation of formation velocity may be difficult to determine if the acoustic signal is too small for the human eye to determine an accurate arrival time. Moreover, the acoustic signal may be delayed by travel time in borehole 24 and integrated logging tool 3, which may present difficulties in predicting and identifying arrival of acoustic signals. Also, noise produced from downhole vibration and/or electronics can distort the acoustic signal and make acoustic signal interpretation difficult. For these reasons, mathematical methods may be used for acoustic signal processing. For example and without limitation, semblance processing may be used to process acoustic signals.

In semblance processing, the acoustic signal is filtered by applying a frequency filter centered at the acoustic transmitter frequency to remove or reduce contributions from downhole vibration and electronics noise. The filtered waveforms are shown in filtered waveform graph 118. In filtered waveform graph 118, X axis 112 and Y axis 114 have the same definitions as in signal receipt graph 110 except that the amplitude in filtered waveform graph 118 is filtered. Filtered waveforms 120 are then processed using semblance techniques to produce semblance graph 122. In semblance graph 122, X axis 124 is the travel time of the acoustic signal and Y axis 126 is the formation slowness (slowness is the inverse of velocity). The intensity of the color of the dark features 128 represent the coherence (or semblance) of the detected arrivals. In this case, three arrivals were detected, which are the compressional velocity and the shear velocity of the formation, and a borehole fluid arrival. To determine the slowness of the arrivals using digital methods, such as semblance processing, data in semblance graph 122 are projected on the Y axis 126 to obtain the semblance projection display 130. Semblance projection display 130 shows the coherence of the data regardless of the time of arrival. X axis 132 of semblance projection display 130 is the formation slowness and the Y axis 135 is the coherence. A mathematical algorithm, such as a semblance algorithm as described in U.S. Pat. No. 5,594,706, Downhole Processing of Sonic Waveform Information, which is incorporated herein by reference, may then be used to determine the slowness of the three arrivals by detecting the peaks 136.

Figure 7A:
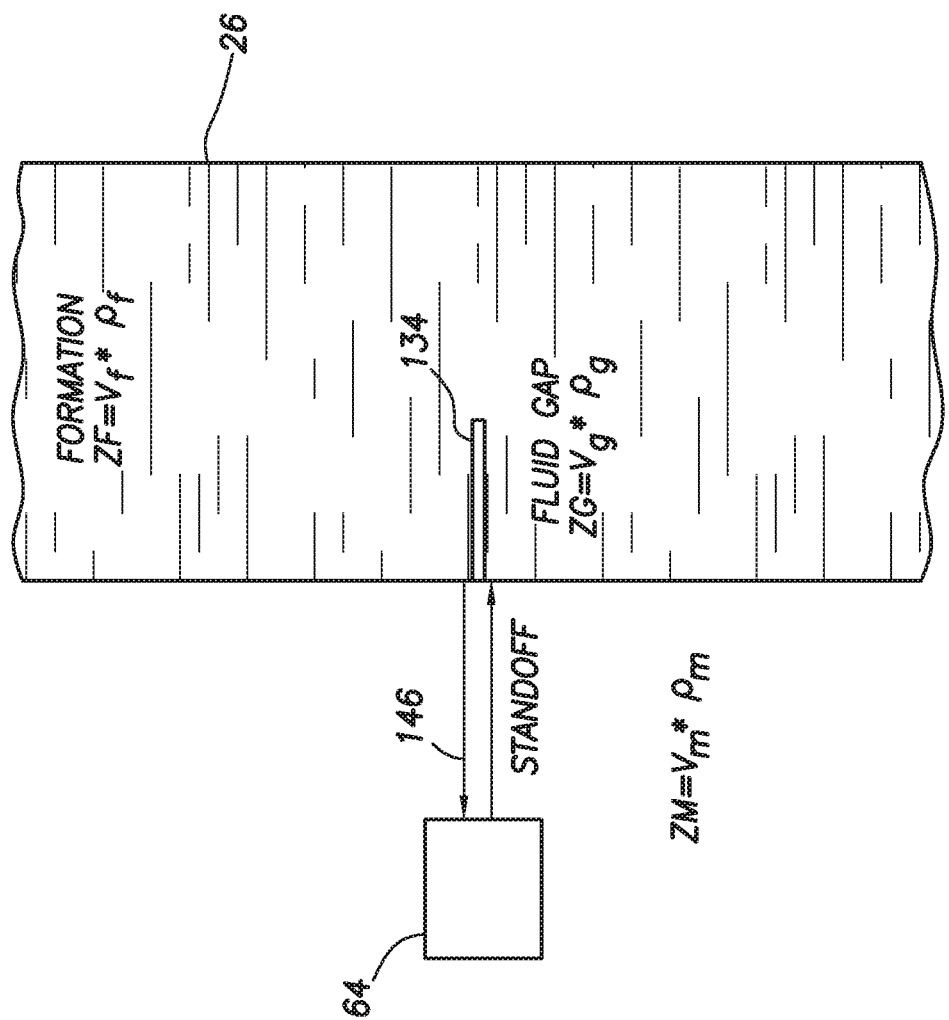
FIG. 7A is a diagrammatic representation of an ultrasonic measurement using an integrated logging tool consistent with at least one embodiment of the present disclosure.

FIG. 7A is diagrammatic representation of a measurement by ultrasonic transducer 64. Ultrasonic transducer 64 fires an ultrasonic pulse ("firing ultrasonic pulse") in the frequency range of 50-500 KHz or 100-500 KHz at time T=0 in a fluid medium 146, such as borehole fluid, that has acoustic impedance ZM (acoustic impedance=bulk density, $\rho$, times acoustic velocity, v), i.e., $ZM=\rho_M * v_M$. Ultrasonic transducer 64 receives an ultrasonic pulse ("received ultrasonic pulse") after the firing ultrasonic pulse is reflected from formation 26. The received ultrasonic pulse has an acoustic impedance ZF, i.e., $ZF=\rho_F * v_F$. Formation 26 includes fluid gap 134 that has acoustic impedance ZG, i.e., $ZG=\rho_F * v_F$. In certain embodiments, fluid gap 134 corresponds to a formation fracture. The received ultrasonic pulse is shown in time series graph 148 in FIG. 7B. X axis 150 of time series graph 148 is the time after firing the firing ultrasonic pulse and Y axis 152 is the ultrasonic pulse amplitude. Firing ultrasonic pulse 158 and received ultrasonic pulse 156 are shown in time series graph 148. The time of arrival of the received ultrasonic pulse 156 is related to the distance between ultrasonic transducer 64 and formation 26 (standoff) by the relationship: Time of Time of Arrival=2*Standoff*$v_M$ where $v_M$ is the velocity of fluid medium 146 occupying the space between the transducer and formation 26. This principle may be used to determine tool standoff for ultrasonic transducer 64. Determining standoff at different azimuthal angles in the borehole produces an image of standoff, which can be used to obtain a borehole caliper image. Determining the standoff may be performed in accordance with the method described in U.S. Pat. No. 5,987,385, Method and Apparatus for Creating an Image of an Earth Borehole or a Well Casing, which is incorporated herein by reference.

Figure 7B:
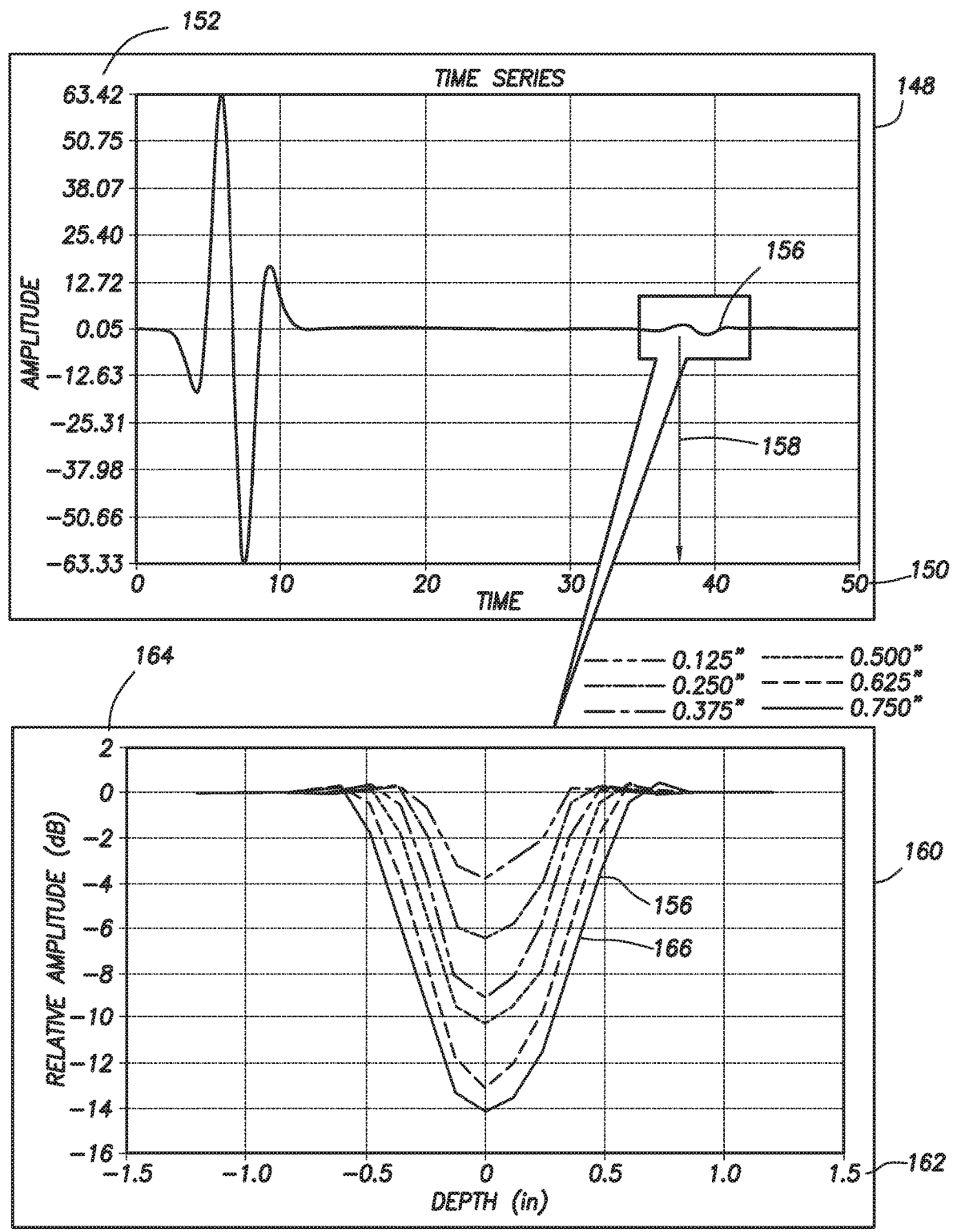
FIG. 7B is a graph depicting relative amplitude of a received ultrasonic pulse as a function of depth from the surface of an ultrasonic transducer for different fluid gap widths as the transducer passes through the fluid gap.

Still referring to FIG. 7B, received amplitude graph 160 shows the amplitude of received ultrasonic pulse 156 relative to a reference of maximum or minimum amplitude ("relative amplitude") as a function of depth from surface of ultrasonic transducer 64 for different fluid gap 134 widths as ultrasonic transducer 64 passes through fluid gap 134. X axis 162 of received amplitude graph 160 is the axial distance or depth from surface as ultrasonic transducer 64 passes through fluid gap 134, with zero being ultrasonic transducer 64 at the center of fluid gap 134. Y axis 164 of received amplitude graph 160 is the relative amplitude of received ultrasonic pulse 156 in decibels. For a given fluid impedance ZG in fluid gap 134, the height of received ultrasonic pulse 156 and the width of the peak 166 is a function of the fluid gap 134 width. As described in U.S. Pat. No. 5,899,958, entitled Logging while Drilling Borehole Imaging and Dipmeter Device, incorporated herein by reference, this principle is used to produce an image of acoustic impedance of an earth formation for ultrasonic transducer 64 at a distance from the formation. Determining acoustic impedance at different azimuthal angles in the borehole produces an image of acoustic impedance of the formation. Fluids in fractures have low acoustic impedance while the rock itself has high acoustic impedance. The acoustic impedance image may be used to identify fractures by reviewing areas with low acoustic impedance and determine widths of the fractures by measuring the width of the relative amplitude received as ultrasonic transducer 64 moves axially or radially in a borehole.

Figure 8:
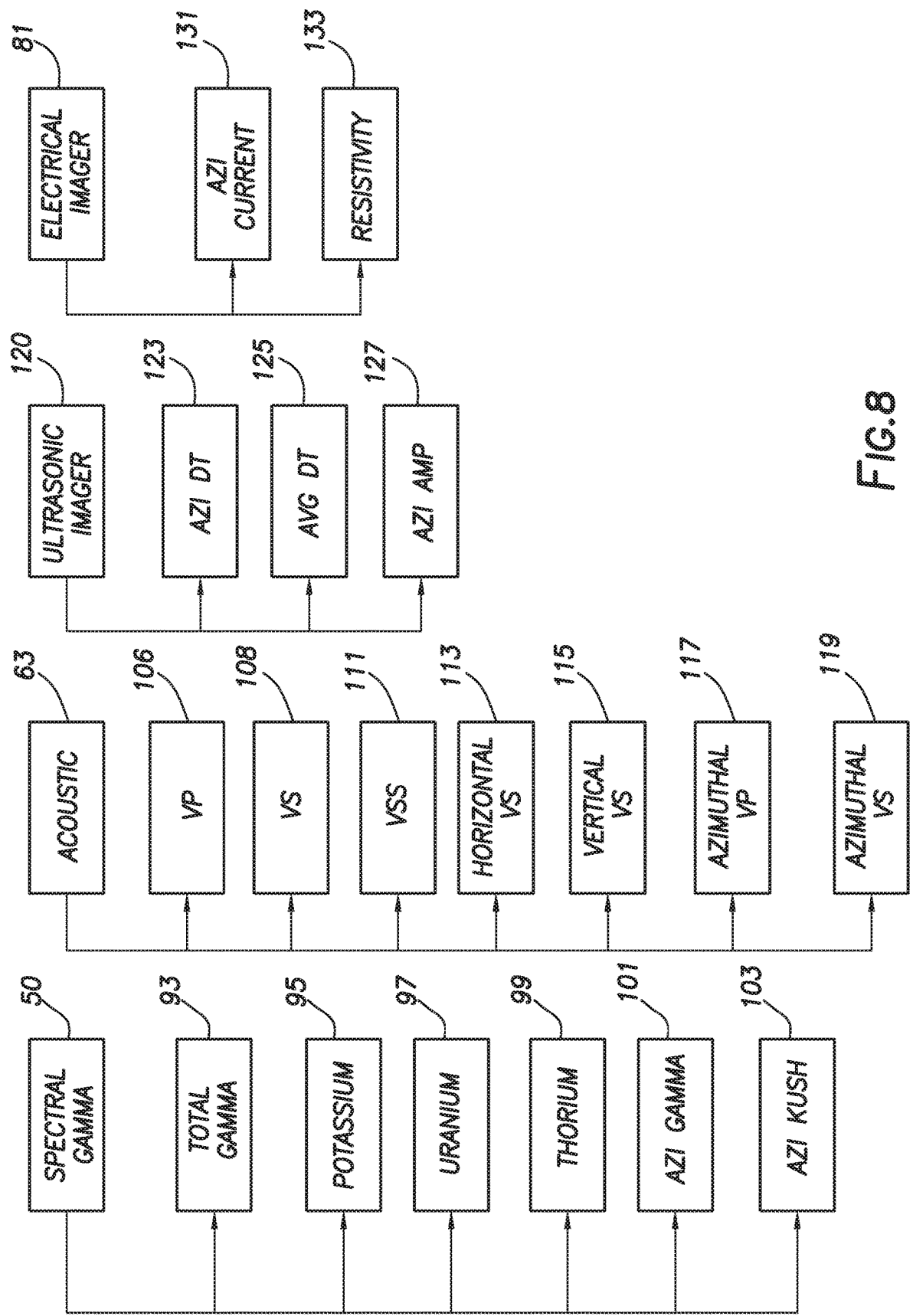
FIG. 8 is a schematic representation depicting exemplary measurements made by an integrated logging tool consistent with at least one embodiment of the present disclosure.

FIG. 8 is a schematic representation of an exemplary set of derived measurements from sensors within integrated logging tool 3. Data retrieved from gamma ray sensor 50, when gamma ray sensor 50 is a spectral gamma ray, may be used to derive total gamma 93, potassium concentration (K) 95, uranium concentration (U) 97, thorium weight percentage (T) 99, azimuthal gamma ray 101, and azimuthal KUTH 103. Data retrieved from acoustic sensor package 63 may be used to derive formation compressional velocity (VP) (compressional velocity measurement 106), formation shear velocity (VS) 108, formation Stonely velocity (VSS) 111, horizontal shear velocity 113, vertical shear velocity 115, azimuthal compressional velocity 117, and azimuthal shear velocity 119. Data from ultrasonic imager 68 may be used to derive average travel time 125, azimuthal travel time 123, and azimuthal amplitude measurements 127. Data from electrical imager 81 may be used to derive formation resistivity 133 and azimuthal current measurements 131.

Figure 9:
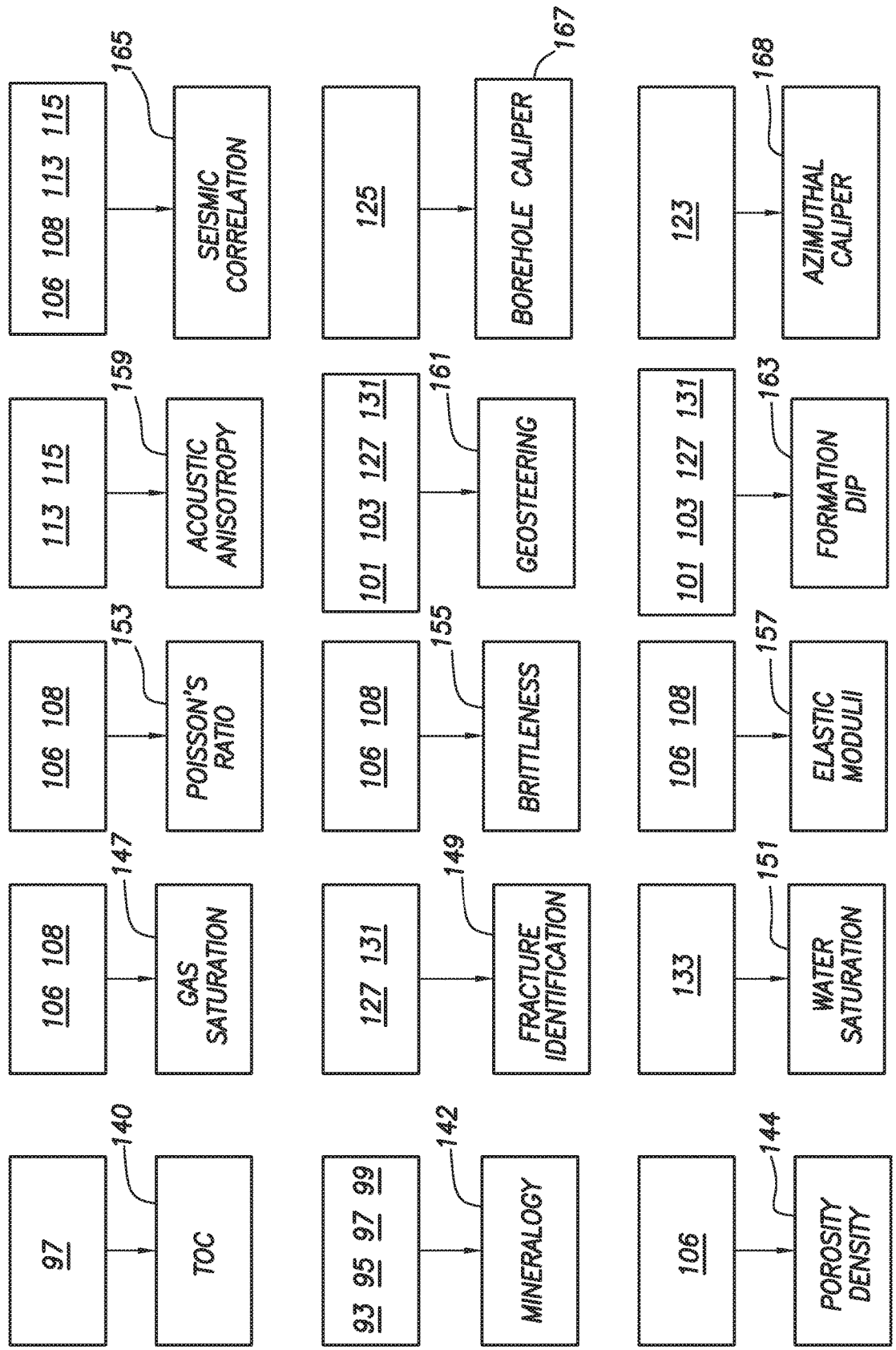
FIG. 9 is a schematic representation depicting use of the exemplary measurements in FIG. 8 for determining certain formation parameters.

FIG. 9 is a schematic representation depicting use of the exemplary measurements in FIG. 8 for determining certain wellbore parameters. Uranium concentration 97 may be used to determine total organic carbon (TOC) 140. Total gamma 93, potassium concentration 95, uranium concertation 97, and thorium concentration 99 may be used to determine formation mineralogy 142. Compressional velocity measurement 106 may be used to determine formation porosity and density 144 if the formation matrix density is known. Compressional 106 and shear 108 velocity measurements may be used to calculate formation gas saturation 147. Azimuthal amplitude measurements 127 and azimuthal current measurements 131 may be used for fracture identification 149. Resistivity measurement 133 may be used to determine formation water saturation 151. Compressional 106 and shear 108 velocity measurements may be used to calculate Poisson's ratio 153, brittleness 155, and elastic moduli 157. Horizontal shear 113 and vertical shear 115 velocity measurements may be used to determine acoustic anisotropy 159. Various derived measurements may be used for geosteering 161 and determination of formation dip angle 163. These derived measurements include, but are not limited to, azimuthal gamma ray 101 and azimuthal KUTH 103, azimuthal current measurement 131, and azimuthal amplitude measurements 127. In addition, azimuthal compressional velocity measurements 117 and azimuthal shear velocity measurements 119 may be used for calculating geosteering 161 and formation dip angle 163. Compressional 106 and shear 108 velocity measurement and/or horizontal shear velocity 113 and vertical shear velocity 115 may be used for determining seismic correlation 165. Average travel time 125 may be used to calculate average standoff and borehole caliper 167. Azimuthal travel time 123 may be used to calculate an azimuthal borehole caliper 168.

Depending on the context, all references herein to the "disclosure" may in some cases refer to certain specific embodiments only. In other cases it may refer to subject matter recited in one or more, but not necessarily all, of the claims. While the foregoing is directed to embodiments, versions and examples of the present disclosure, which are included to enable a person of ordinary skill in the art to make and use the disclosures when the information in this patent is combined with available information and technology, the disclosures are not limited to only these particular embodiments, versions and examples. Other and further embodiments, versions and examples of the disclosure may be devised without departing from the basic scope thereof and the scope thereof is determined by the claims that follow.

What is claimed is:

1. An integrated logging tool comprising:
an outer housing;
an insert, the insert positioned within the outer housing;
a gamma ray sensor positioned within the insert;
an acoustic sensor package, the acoustic sensor package positioned within a cutout, the cutout located circumferentially about a bore through the outer housing, the acoustic sensor package including:
an acoustic transmitter;
an acoustic isolator; and
one or more acoustic receivers.

2. The integrated logging tool of claim 1 further comprising a directional sensor, inclination sensor, vibration sensor, or a combination thereof positioned within the insert.

3. The integrated logging tool of claim 2 further comprising electronics, the electronics including a clock.

4. The integrated logging tool of claim 3, wherein each of the sensors is in electrical communication with the clock, wherein the clock is a single clock.

5. The integrated logging tool of claim 1 further comprising electronics, wherein the gamma ray sensors and the electronics are interleaved.

6. The integrated logging tool of claim 1, wherein the acoustic sensor package further comprises an ultrasonic imager.

7. The integrated logging tool of claim 1, wherein the bore is an off-center bore.

8. The integrated logging tool of claim 1, wherein the acoustic sensor package is electrically connected with electronics, the electronics positioned within the insert.

9. The integrated logging tool of claim 1, wherein the integrated logging tool is in a logging while drilling configuration.

10. The integrated logging tool of claim 1, wherein the insert is a single insert.

11. The integrated logging tool of claim 1 further comprising an electrical imager.

12. The integrated logging tool of claim 11, wherein the electrical imager comprises:
an insulating sleeve, the insulating sleeve positioned on the outer housing;
a stabilizer, the stabilizer positioned on the insulating sleeve; and
a button electrode array, the button electrode array positioned on the stabilizer, the button electrode array comprising one or more button electrodes.

13. The integrated logging tool of claim 12 further comprising an upper transmitter/receiver toroid positioned above the button electrode array and a lower transmitter/receiver toroid positioned below the button electrode array.

14. A method for determining unconventional formation parameters comprising:
deploying an integrated logging tool in a wellbore, the integrated logging tool comprising:
an outer housing;
an insert, the insert positioned within the outer housing;
a spectral gamma ray sensor positioned within the insert;
an acoustic sensor package, the acoustic sensor package positioned within a cutout, the cutout located circumferentially about a bore through the outer housing, the acoustic sensor package including:
an acoustic transmitter;
an acoustic isolator; and
one or more acoustic receivers; and
determining total gamma ray.

15. The method of claim 14, wherein an inclination sensor, a vibration sensor, a directional sensor, or a combination thereof are positioned within the insert; and
determining potassium weight percentage, uranium weight percentage, thorium weight percentage, azimuthal total gamma ray, azimuthal KUTH, or a combination thereof.

16. The method of claim 15 further comprising:
determining total organic carbon and formation mineralogy.

17. The method of claim 15 wherein the method further comprises:
deriving formation compressional velocity (VP), formation shear velocity (VS), formation Stonely velocity (VSS), horizontal shear velocity, vertical shear velocity, azimuthal compressional velocity, azimuthal shear velocity, or a combination thereof using the acoustic sensor package.

18. The method of claim 17 further comprising:
determining formation porosity and formation density.

19. The method of claim 17 further comprising:
calculating formation gas saturation.

20. The method of claim 17, wherein the integrated logging tool further comprises an ultrasonic imager and wherein the method further comprises:
deriving average travel time, azimuthal travel time, and azimuthal amplitude measurements.

21. The method of claim 20, wherein the integrated logging tool further comprises an electrical imager and wherein the method further comprises:
deriving formation resistivity and azimuthal current measurements.

22. The method of claim 21, wherein the method further comprises:
determining fracture identification, formation water saturation, Poisson's ratio, brittleness, elastic moduli acoustic anisotropy, and combinations thereof.

23. The method of claim 21, wherein the method further comprises:
geosteering the integrated logging tool.

24. The method of claim 21, wherein the method further comprises:
performing dip calculations.

25. The method of claim 21, wherein the method further comprises:
determining seismic correlation.

26. The method of claim 21, wherein the method further comprises:
calculating average standoff, borehole caliper, azimuthal borehole caliper, or a combination thereof.

* * * * *